April 12, 1966  C. L. AUSTIN  3,245,663
AGGLOMERATOR APPARATUS AND METHOD

Filed Aug. 3, 1964  4 Sheets-Sheet 1

INVENTOR.
CURTIS L. AUSTIN
BY
ATTORNEY

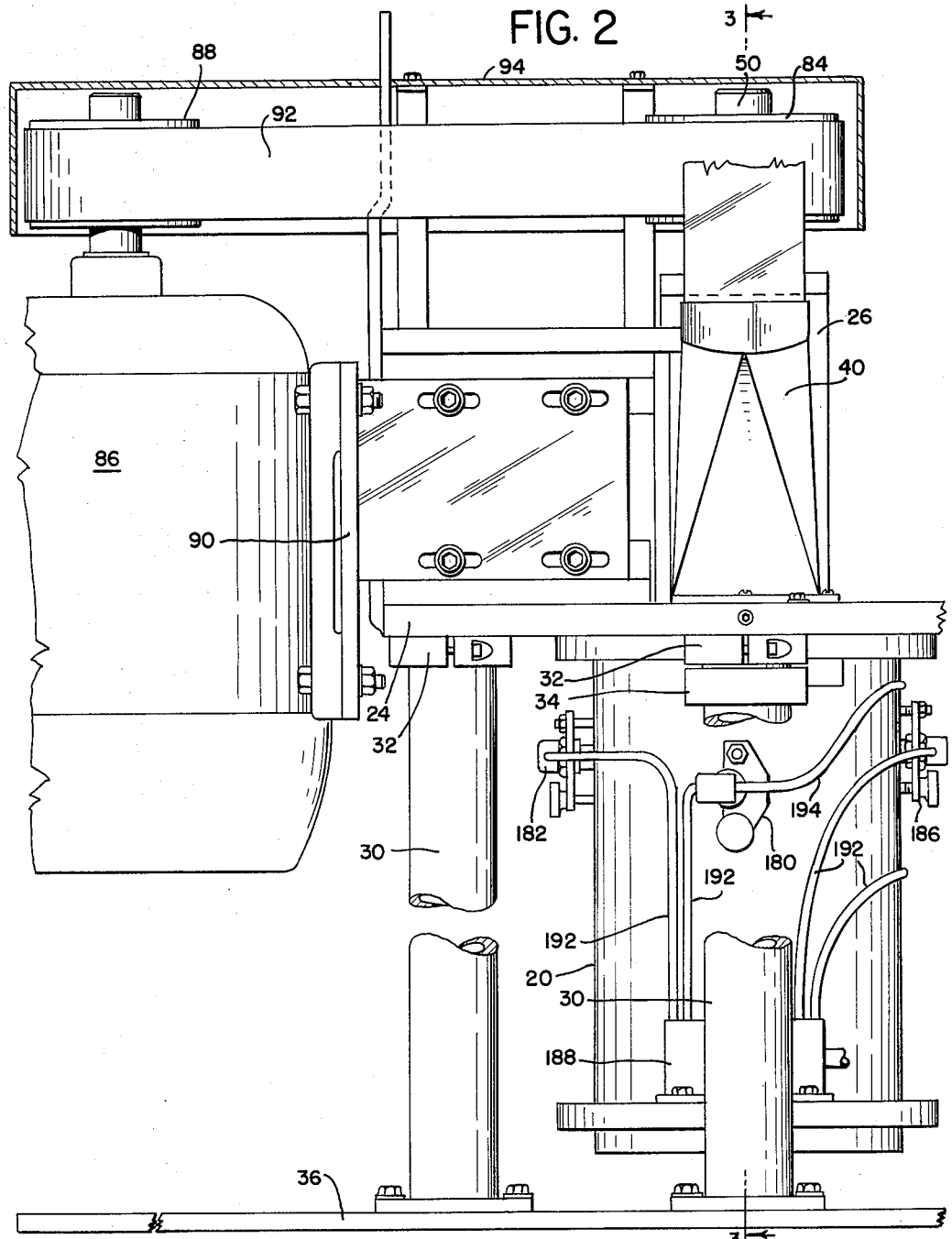

April 12, 1966   C. L. AUSTIN   3,245,663
AGGLOMERATOR APPARATUS AND METHOD
Filed Aug. 3, 1964   4 Sheets-Sheet 3

INVENTOR.
CURTIS L. AUSTIN
BY
*L. M. Roy Lillehaugen*

ATTORNEY

April 12, 1966 C. L. AUSTIN 3,245,663
AGGLOMERATOR APPARATUS AND METHOD
Filed Aug. 3, 1964 4 Sheets-Sheet 4

INVENTOR.
CURTIS L. AUSTIN
BY
*L. Mosroy Lillehaugen*
ATTORNEY

United States Patent Office 3,245,663
Patented Apr. 12, 1966

3,245,663
AGGLOMERATOR APPARATUS AND METHOD
Curtis L. Austin, Minneapolis, Minn., assignor to General Mills, Inc., a corporation of Delaware
Filed Aug. 3, 1964, Ser. No. 386,975
21 Claims. (Cl. 259—8)

The present invention pertains to a mixing and blending apparatus, and more particularly to an apparatus for forming agglomerates by adding a wetting agent to a pulverulent material and admixing them to form loosely bound, randomly sized and shaped particles.

Various types of devices are known in the art for forming free flowing, relatively dustless, small aggregates out of a dusty, pulverulent material such as flour, carbon black, or the like. Such devices normally include a horizontally or vertically oriented mixing chamber or drum into which the material to be acted upon is admitted, and an agitator within the chamber for acting upon the material. An elongate shaft having a number of paddles, beaters, blades or rods secured thereto, is rotatably mounted within the chamber so that its longitudinal axis extends in the same direction as the major axis of the chamber, by journalling each of its ends in appropriate bearings. Material to be mixed and blended is admitted into the chamber at one end, caused to move through the chamber by means of the paddles, and discharged therefrom at the other end, after it has been acted upon by the paddles.

It has been found that the above devices have not been entirely satisfactory for forming agglomerates or aggregates having the desired characteristics, and such devices have not been as efficient as might be desired. By positioning the chamber so that its major axis is mounted in a horizontal plane for example, the paddles are relied upon to force or move the material through the chamber, as well as to mix and blend the material. In some instances, excessive stresses might be exerted on the shaft and/or the paddles, and the power required to drive the paddles might be difficult to obtain. On the other hand, by vertically positioning the chamber and feeding the material into the chamber at its top portion, the paddles must be so designed and adjusted so that the material, aided by the force of gravity, does not flow through the chamber too rapidly; moreover, if the material is admitted into the chamber at its bottom portion, the paddles must force the material upwardly. Furthermore, it has been found that when the chamber is vertically oriented, the lower bearing mounting for the shaft impedes the flow of material through the chamber, and the mixed material has a tendency to collect thereon. It has also been found that in order to obtain a product having the desired characteristics, it is essential that the spacing between the tips of the paddles and the inner surface of the chamber be maintained at a predetermined distance.

Accordingly, one object of the present invention is to provide an improved apparatus for forming agglomerates.

Another object is to provide an apparatus for forming a homogenized agglomerate out of a heterogeneous mixture of material and a wetting agent.

Still another object is to provide a vertically oriented mixing and blending apparatus having an improved agitator therein for mixing and blending material admitted into the upper portion of the apparatus, as the material is caused to move through the apparatus and out through the lower portion.

A further object is to provide a vertically oriented agglomerating apparatus in which there is no tendency for material to collect at the discharge end of the apparatus.

A still further object is to provide an agglomerator having an cantilevered shaft rotatably mounted therein, for forming free flowing, relatively dustless, small aggregates out of a dusty, pulverulent material and a fluid medium.

Another object is to provide a vertically oriented mixing and blending apparatus in which the capacity of the apparatus can be controlled by adjusting the blade angle of a plurality of beaters adjustably mounted within the apparatus.

Still another object is to provide an agglomerator having a plurality of radially extending beaters therein for admixing materials admitted thereinto, the beaters being adjustably secured to a rotatably mounted shaft longitudinally positioned within the agglomerator, without changing the effective length of the beater.

Another object of the present invention is to provide an improved method of treating pulverulent material.

Other objects and advantages of this invention will become apparent from a consideration of the following specification and drawings. Before proceeding with a detailed analysis of the invention however, a brief description of it will be presented.

Briefly, the agglomerating apparatus of the present invention includes a vertically oriented cylindrical casing having an inlet for admitting material thereinto at its upper end, and an unobstructed opening at its lower end for discharging material therefrom. An elongate cantilevered shaft is rotatably mounted adjacent the upper portion of the casing so that its cantilevered end projects into the casing toward the bottom end. A plurality of radially extending beaters, having flattened blade portions, are adjustably secured to the shaft in such a manner that they can be rotated about their longitudinal axis, so as to change the blade angle of each beater, without changing the effective length of the beater. Each beater can be adjusted so that its blade portion defines a predetermined angle with respect to a vertical plane, or in the alternative, a horizontal plane. One or more nozzles are provided for admitting a fluid medium into the casing. As the shaft is caused to rotate about its longitudinal axis, the beaters admix the material admitted at the upper end of the casing with the fluid medium, thereby forming agglomerates or aggregates which are discharged from the bottom end of the casing.

The invention will best be understood by reference to the following drawings, wherein:

FIGURE 2 is an enlarged side elevational view of the agglomerator illustrated in FIGURE 1;

For purposes of illustration, the agglomerating apparatus will be described in conjunction with the production of agglomerates or aggregates out of a pulverulent material such as flour. Flour, after being produced by a conventional milling process, is a dusty material, because of its fine particle size; it is not free-flowing, consequently, when it is poured, the flow is uneven, and often the flour will splash out of the receptacle; it is not readily wettable and it is difficult to disperse in liquid. A number of other materials have similar characteristics, such as carbon black, dried milk powder, and cocoa powder; therefore, it is envisioned that the present invention might be used for producing agglomerates or aggregates out of materials of this type as well.

Figure 1:
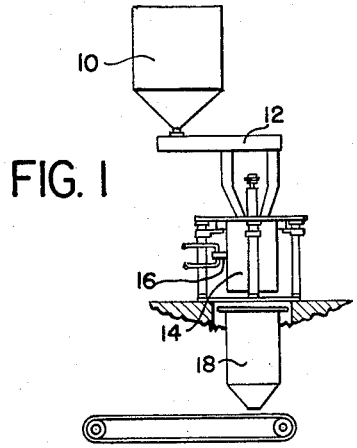
FIGURE 1 is a schematic flow diagram illustrating apparatus for forming agglomerates or aggregates out of a pulverulent material.

In FIGURE 1, a pulverulent material such as flour, is fed from a bin 10 to a feeder 12, from which it is admitted into a vertically oriented agglomerator 14, also referred to hereinafter as a mixing and blending apparatus. A wetting agent, such as water, is introduced into the agglomerator 14 through one or more nozzles 16. The flour within the agglomerator 14 becomes moistened and after being admixed within the agglomerator 14, it forms moist agglomerated particles or aggregates. The agglomerates are discharged from the bottom of the agglomerator 14, preferably, directly into a drier 18, from where they are conveyed to a packaging apparatus, or admitted to a storage bin for future packaging. It must be realized of course that if desired, additional steps might be included, such as classifying, grinding, and the like before the agglomerates are ultimately packaged.

Figure 3:
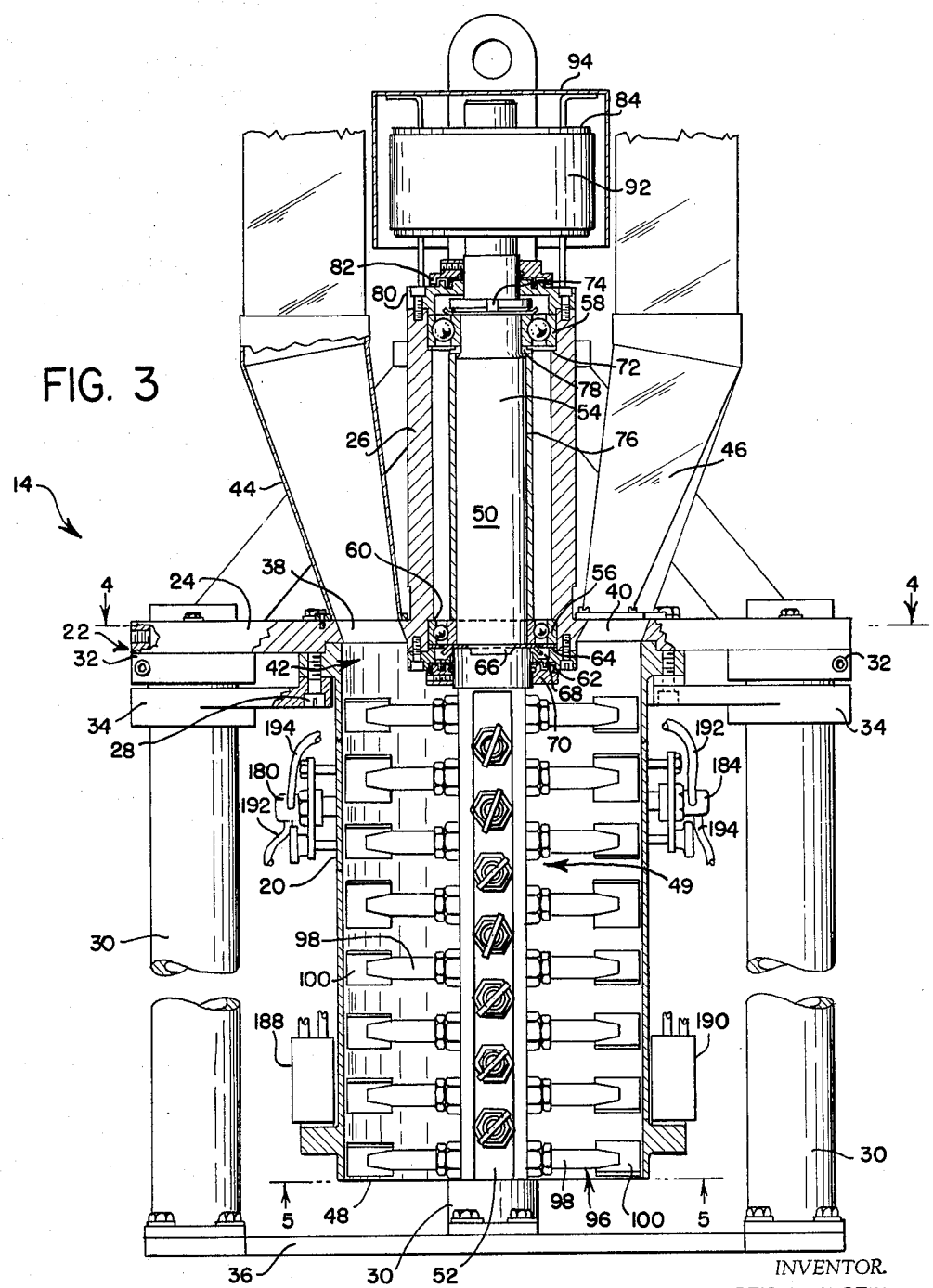
FIGURE 3 is a sectional view taken along 3—3 of FIGURE 2.

FIGURES 2 and 3 illustrate the agglomerator 14 in greater detail. The agglomerator includes a vertically oriented cylindrical processing casing 20, which is maintained in a vertical position by attaching it to a bearing housing 22 by appropriate means, such as bolt and nut assemblies 28. The bearing housing includes a horizontal portion 24 and an integral neck portion 26, and it is mounted on a plurality of legs or posts 30. A clamp 32, fixedly secured to each leg 30 by appropriate means, prevents the bearing housing 22 from sliding down the legs 30. A guide bracket 34 is slidably mounted on at least two of the legs 30 and it is attached to the casing 20 and the bearing housing 22 by the bolts 28. Each leg is secured to a mounting base 36 by appropriate means.

A pair of openings 38 and 40 are formed in the horizontal portion 24 of the bearing housing 22; these openings permit material to be admitted into the upper portion 42 of the casing 20. A pair of spouts 44 and 46 are secured to the bearing housing by appropriate means, for directing material from the feeder 12 into the casing 20. The lower end of the casing 20 is unobstructed, so that the opening 48 is the same size as the interior diameter of the casing.

Figure 6:
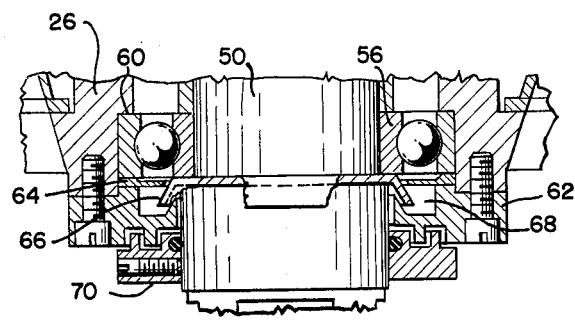
FIGURE 6 is a partial enlarged sectional view of the shaft shown in FIGURE 3, and the manner in which it is mounted within the casing.

An elongate beater assembly, designated generally by reference numeral 49, is rotatably mounted within the casing 20. The beater assembly includes a shaft 50 having end portions 52 and 54, and a plurality of mixing beaters 96 adjustably secured to the shaft 50. The shaft 50 is rotatably mounted within the casing 20 solely by its end portion 54, so that it is cantilevered within the casing 20 and coaxial therewith; the other end portion 52 projects toward the lower end of the casing. The end portion 54 is rotatably mounted in the bearing housing 22 by means of bearings 56 and 58. The bearing 56 abuts against a shoulder 60 formed in the lower portion of the neck 26, and it is retained in position by securing an end plate 62 to the bearing housing 22 (note FIGURE 6). A shield 64 and a slinger 66 are interposed between the end plates 62 and the bearing 56, and a cavity 68 is formed between the shield 64 and the end plate 62. A seal member 70 is secured to the shaft 50 and a first labyrinth seal is formed between the end plates 62 and the member 70.

The bearing 58 likewise abuts against a shoulder 72 formed in the neck portion 26. A bearing lock nut and washer assembly 74 maintains the bearing 58 in position. Interposed between the bearings 56 and 58 is a sleeve 76 and a ring 78. An end plate 80 is secured to the top end of the neck portion 26, and a seal member 82 is secured to the shaft 50; together, they form a second labyrinth seal.

The labyrinth seals prevent grease which lubricates the bearings, from entering the casing 20 and coming in contact with the material therein. When the shaft 50 is rotated about its axis, the bearings 56 and 58 may become heated; as a result, grease in the bearings might drip into the casing unless adequate seals are provided. The slinger 66 disperses the grease outwardly away from the shaft, and it collects in the cavity 68 and ultimately in the labyrinth seal. In due course, the cavity and seal should be cleaned. The seals also prevent dust and particles from coming in contact with the bearings 56 and 58.

A sheave 84 is fixedly secured to the top end of the shaft 50. A drive motor 86, having a sheave 88 secured to its output shaft, is attached to the agglomerator 14 by means of a mounting bracket 90. The sheave 84 is operatively connected to the motor 86 by means of a drive belt 92. A belt guard 94 covers the sheaves and the belt.

Figure 5:
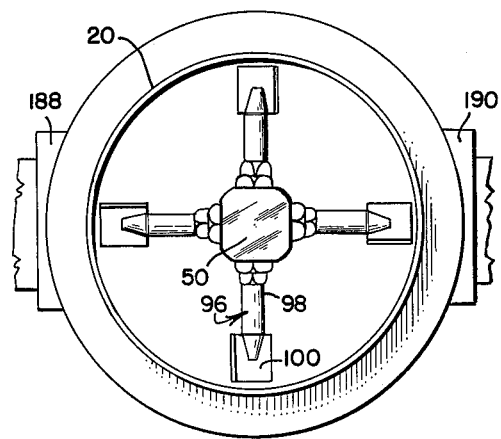
FIGURE 5 is a partial sectional view taken along line 5—5 of FIGURE 3.
Figure 4:
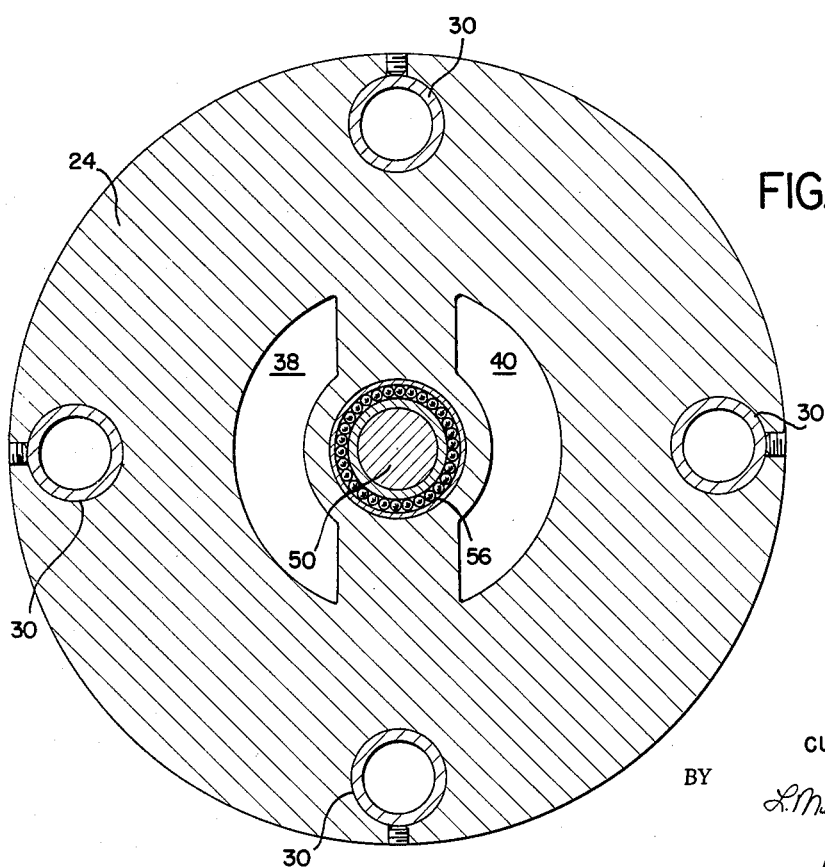
FIGURE 4 is a sectional view taken along 4—4 of FIGURE 3.

The mixing beaters are adjustably secured to the cantilevered end portion 52 of the shaft 50 in different ways. Each beater generally includes a shank portion 98 and a flattened blade portion 100. Each beater 96 lies in a horizontal plane and projects radially away from the longitudinal axis of the shaft 50, toward the inner surface of the casing wall; and a path circumscribed in a horizontal plane by the tip of each beater defines a prescribed circle, the perimeter of which is maintainable at a prescribed distance from the casing wall. The beaters are spaced at 90° intervals about the periphery of the shaft (note FIGURE 5), and they are mounted in pairs along the longitudinal axis of the shaft, the beaters of each pair being spaced 180° apart relative to each other. By rotating each beater 96 about its longitudinal axis, the blade portion 100 can be adjusted so that it defines a predetermined angle with respect to a vertical plane; this angle is referred to hereinafter as the blade angle. Each beater 96 is secured to the shaft 50 in such a manner that the angular orientation of each beater, i.e., the blade angle, can be changed without changing the effective length of the beater; in other words, the spacing between the tip of the blade at its centerline, and the inner surface of the casing remains the same regardless of the blade angle, and the radial distance of the blade tip at its centerline with respect to the shaft axis remains the same. By changing the angular orientation of the beaters, passage of the material through the agglomerator can be regulated, and the mixing and blending action exerted on the material controlled.

Figure 7:
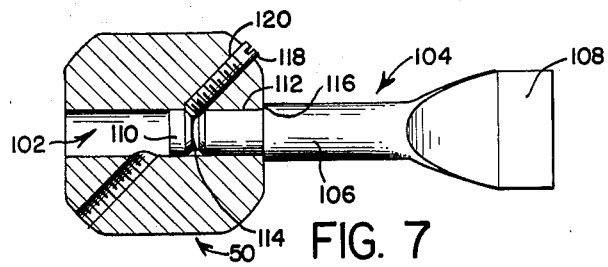
FIGURE 7 is an enlarged sectional view illustrating a beater and the manner of its attachment to a shaft.
Figure 8:
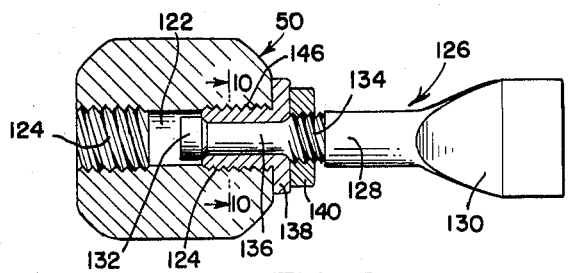
FIGURE 8 is an enlarged sectional view illustrating another beater and the manner of its attachment to a shaft.
Figure 9:
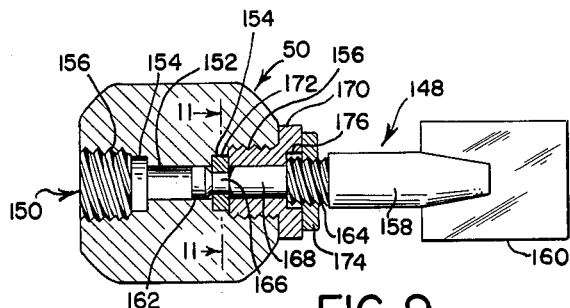
FIGURE 9 is an enlarged sectional view illustrating still another beater and the manner of its attachment to a shaft.

FIGURES 7–9 illustrate different embodiments of the beaters, and the manner in which they are adjustaby attached to the shaft 50. For illustrative purposes, numeral 50 will designate the shaft in all instances. In FIGURE 7, the shaft 50 is provided with a bore 102 which extends through the shaft, normal to the longitudinal axis of the shaft, so that a pair of beaters spaced 180° apart relative to each other, can be attached to the shaft. For purposes of illustration however, only one beater is shown secured to the shaft in FIGURE 7. The beater 104 includes a shank 106, and a flattened blade portion 108 integrally connected to a first end of the shank 106. The other end 110 of the shank includes a cylindrical portion 112 having a circumferential groove 114 therein, the portion 112 forming a shoulder 116 with the remainder of the shank 106. The means for attaching the beater to the shaft includes a set screw 118 which is threadedly inserted within an internally threaded bore 120.

The beater 104 is adjustably secured to the shaft 50 by inserting the end 110 into the bore 102 until the shoulder 112 abuts against the shaft 50. The bore 120 is aligned so that the screw 118 will engage the groove 114, By tightening the screw 118 against the groove 114, the beater is maintained in a fixed position, and the blade portion 108 defines a prescribed angle with respect to vertical or horizontal planes. If desired, the blade angle can be readily changed by loosening the screw 118 and rotating the beater about its longitudinal axis until a new blade angle is achieved. It is emphasized that the change in angular position of the beater can be accomplished without changing the effective length of the heater.

Figure 10:
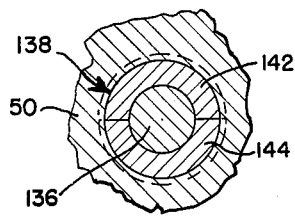
FIGURE 10 is a partial sectional view taken along 10—10 of FIGURE 8.

In FIGURE 8, the shaft 50 is likewise provided with a bore 122, normal to the shaft axis. The bore 122 includes internally threaded portions 124, and it extends through the shaft so that a pair of beaters can be secured to the shaft in such a manner that they are diametrically opposite each other. The beater 126 includes a shank 128 and a flattened blade portion 130 integrally connected to a first end of the shank. The shank 128 has a head portion 132 at its other end, a threaded portion 134 intermediate its ends, and a cylindrical portion 136 between the head and the threaded portions. The diameter of the cylindrical portion 136 is smaller than the diameters of the head and threaded portions. The means for securing the beater 126 to the shaft includes a split sleeve member 138 and a jam nut 140. The sleeve member includes two similar members 142 and 144 (note FIGURE 10), which have an externally threaded portion 146.

To adjustably secure the beater 126 to the shaft 50, the jam nut 140 is threaded onto the threaded portion 134 of the shank 128, and the beater is inserted within the split sleeve member 138, so that member 138 surrounds the cylindrical portion 136 of the shank 128. The split sleeve member 138 is then threadedly inserted within the bore 122 and tightened relative to the shaft 50. The beater 126 is rotated about its axis until the blade portion 130 defines a predetermined angle with respect to a vertical plane. By tightening the jam nut 140 against the split sleeve member 138, the blade 126 is maintained in a fixed position. By loosening the jam nut 140, the blade is free to rotate about its longitudinal axis with respect to the sleeve 138, and the blade angle of the beater 126 can be readily changed without changing the effective length of the beater.

Figure 11:
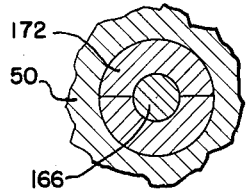
FIGURE 11 is a partial sectional view taken along line 11—11 of FIGURE 9.

FIGURE 9 illustrates another beater embodiment 148 and its manner of attachment to the shaft 50. The shaft 50 is provided with a bore 150 which extends through the shaft, similar to that described above in connection with FIGURES 7 and 8. The bore 150 includes a first cylindrical portion 152, second cylindrical portions 154, and internally threaded portions 156. The heater 148 includes a shank 158 and a flattened blade portion 160 connected to one end of the shank. The shank 158 has a head portion 162 at its other end, a threaded portion 164 intermediate its ends, a first cylindrical portion 166 adjacent the head portion 162, and a second cylindrical portion 168 between the first cylindrical portion 166 and the threaded portion 164. The diameter of the first cylindrical portion 166 is smaller than the diameters of the head and the second cylindrical portions, and the diameter of the second cylindrical portion 168 is smaller than the diameter of the threaded portion 164. The means for securing the beater to the shaft include a tubular externally threaded insertion member 170, a split ring 172, and a jam nut 174. The insertion member 170 is provided with a recess 176; and the split ring 172 is formed by two identical members (note FIGURE 11).

The beater 148 is adjustably connected to the shaft 50 by threading the jam nut 174 onto the threaded portion 164; by inserting the shank 158 within the insertion member 170 so that member 170 surrounds the cylindrical portion 168 and the end of the threaded portion 164 is positioned within the recess 176; and by mounting the split ring 172 on the shank so that it encircles the cylindrical portion 166. The insertion member 170 is threadedly inserted within the bore 150, and more specifically the internally threaded portion 156, and tightened with respect to the shaft. Note that the split ring 172 is positioned within the cylindrical portion 154, and the head 162 is positioned within the cylindrical portion 152. The beater 148 is rotated about its axis until the desired blade angle is attained. When the desired angle is attained, the jam nut 174 is drawn tight against the insertion member 170, and the beater is maintained in a fixed position. By loosening the jam nut 174, the angular orientation of the beater can be changed without changing the effective length of the beater 148.

A number of nozzles 180, 182, 184 and 186 are spaced around the periphery of the casing 20 for introducing a fluid medium into the upper portion of the casing 20 for wetting the pulverulent material. Different types of wetting agents might be used; for purposes of illustration, water will be described. Multiple nozzle locations permit more uniform wetting action. Each nozzle is connected to a source of water and a source of air, and the water is atomized by the air as it passes through the nozzles into the casing. By atomizing the water, it disperses better and the agglomerating process is more readily accomplished. Each nozzle is connected to a water manifold 188 by tubes 192, and to an air manifold 190 by tubes 194. Each manifold in turn is connected to an appropriate source (not shown). For better wetting results, some of the nozzles, e.g. 180 and 184, are spaced lower along the longitudinal axis of the casing 20, than nozzles 182 and 186. Nozzles of this type are commercially available and will not be described in further detail. The amount of water used will depend upon the type of material being agglomerated, e.g. whether it is flour, carbon black, or some other powdery material, the type of drying equipment used, and the like. Moreover, the amount of water is accurately proportioned with respect to the rate of supply of the flour to the agglomerator, so as to limit the supply of the liquid within the proportions which will effect suitable moistening of the flour without formation of any paste.

In operation, the shaft 50 is caused to rotate about its longitudinal axis by energizing the motor 86. The speed of rotation of the shaft might vary, preferably, in the range of 2500 to 3500 r.p.m. Flour, or other pulverulent material, is admitted to the top end of the casing 20 through the spouts 44 and 46, and the inlet openings 38 and 40. Atomized water droplets, or some other wetting agent, are introduced into the upper portion of the casing through the nozzles 180–186. As the flour moves downwardly within the casing 20 due to the force of gravity and the propelling action of the beaters 96, as it is admixed with the water, and as the flour particles come in contact with drops of water, agglomerates or aggregates are formed. The agglomerates eventually pass out through the discharge end 48 of the casing 20, from where they are subjected to additional processing steps, such as drying. Since the shaft 50 is cantilevered within the casing 20, no lower bearing is required; as a result, greater throughput of material is achieved, the agglomerates do not collect on or adhere to the bearing mount, and a better and more consistent quality of agglomerated material is produced.

The spacing between the tips of the beaters 96 and the casing wall is important. If the distance is too small, the tips of the beaters might contact the inner surface of the casing, especially when the shaft 50 is rotated at high speeds. On the other hand, if the spacing is too great, the properties of the agglomerates might be adversely effected, particularly with respect to the formation of unusually large chunks of material. Moreover, high momentary loads on the shaft might occur, probably caused by product build-up on the inner surface of the casing 20. It has been found for example, that a clearance of about 0.030 inch has proven satisfactory.

Each beater 96 is set so that a predetermined blade angle is maintained. In some instances, it is envisioned that the blade angle might be the same for each beater; in other instances, the blade angle might vary for different beaters. It has been found that the blade angle should not be too small; if it is, deposits might tend to collect on the blade portion of the beater. On the other hand, if the blade angle is too large, the sweep of one blade will not overlap the sweep of each adjacent blade; consequently, improper mixing and blending might result. In order to change the blade angle of the beaters, the bolt and nut assemblies 28 are removed, and the casing 20 is free to slide down, away from the bearing housing 22. Each beater is then set in a manner described hereinbefore.

It has been found for example, that by varying the settings of the blades, favorable agglomerating results are obtained. As viewed in FIGURE 3 for example, beginning at the top of the casing 20, the top pair of blades are set so that they are almost vertical; the second, third, fourth, seventh and eighth pairs are set so that the blade angle is approximately 30° and all remaining pairs are set at about 45°. These blade settings result in an agglomerated product of high quality. It must be realized of course, that these settings can be varied dependent upon the type of flour used, the amount of liquid added, the speed of rotation of the shaft 50, and the like. It is stressed that regardless of the blade angle used, the effective length of the beater will remain the same because of the manner in which each blade is adjustably secured to the shaft 50.

In producing flour agglomerates, it is desirable that it have a uniform bulk density, and it should have substantially the same cup weight as flour, so that recipe changes are avoided. The cup weight can be regulated by controlling the particle size of the flour agglomerates. It has been found that by using the agglomerator hereindescribed in lieu of known existing devices, for forming agglomerates out of flour, a greater conversion of flour to agglomerates having a desired particle size is attained, a more homogeneous product is obtained, and it is possible to control to some extent, the cup weight of the end product. As a result, agglomerates are formed which have the optimum characteristics.

In the above description and attached drawings, a disclosure of the principles of this invention is presented, together with some of the embodiments by which the invention may be carried out.

Now therefore I claim:

1. A mixing and blending apparatus comprising a casing, an elongate shaft rotatably mounted within said casing so that it is coaxial therewith, a plurality of mixing beaters, means for attaching each beater to said shaft so that it projects radially away from the shaft axis toward the inner surface of the casing and its angular position about its longitudinal axis can be varied without changing its effective length, means for rotating said shaft about its longitudinal axis, inlet means for admitting material into said casing, and outlet means for discharging said material therefrom after it has been subjected to a mixing and blending operation.

2. The combination of claim 1 wherein the shaft includes a plurality of bores therein normal to the shaft axis, each beater includes a shank and a blade portion connected to one end of said shank, the other end of said shank includes a cylindrical portion having an annular groove therein, said other end of the shank being inserted within one of said bores, and the means for attaching each beater to the shaft includes means for retaining said beater within said bore by engaging the annular groove, said means enabling the beater to be rotated about its longitudinal axis until a predetermined blade angle is achieved, said beater being restrained against rotation about its longitudinal axis and removed from the bore when the groove engaging means is forced against the groove.

3. The combination of claim 2 wherein each bore extends through the shaft, and two beaters are adjustably mounted within each bore, said beaters being diametrically opposite each other.

4. The combination of claim 1 wherein the shaft includes a plurality of bores therein normal to the shaft axis, each beater includes a shank and a blade portion connected to one end of said shank, said shank having a head portion at its other end, a threaded portion intermediate its ends, and a cylindrical portion between said head and threaded portions, the diameter of said cylindrical portion being smaller than the diameters of the head and threaded portions, and the means for attaching each beater to the shaft includes a sleeve member and a jam nut, said sleeve member adapted to surround the cylindrical portion of the shank, and said jam nut adapted to threadedly engage the threaded portion of the shank, said sleeve member being fixedly inserted within one of said bores in the shaft, said sleeve member and said jam nut enabling the beater to be rotated about its longitudinal axis until a predetermined blade angle is achieved, said beater being restrained against rotation about its longitudinal axis and removed from the bore when the jam nut is tightened against the sleeve member.

5. The combination of claim 1 wherein the shaft includes a plurality of bores therein normal to the shaft axis, each beater includes a shank and a blade portion connected to one end of said shank, said shank having a head portion at its other end, a threaded portion intermediate its ends, a first cylindrical portion adjacent the head portion, and a second cylindrical portion between the first cylindrical portion and the threaded portion, the diameter of said first cylindrical portion being smaller than the diameter of the head and second cylindrical portions, and the diameter of the second cylindrical portion being smaller than the diameter of the threaded portion, and the means for attaching each beater to the shaft includes a tubular insertion member, a ring member, and a jam nut, said insertion member adapted to surround the second cylindrical portion of the shank, said ring adapted to encircle the first cylindrical portion, and said jam nut adapted to threadedly engage the threaded portion of said shank, said insertion member being fixedly inserted within one of said bores in the shaft so that the beater projects radially away from the shaft axis, said means enabling the beater to be rotated about its longitudinal axis until a predetermined blade angle is achieved, said beater being restrained against rotation about its longitudinal axis and removed from the bore when the jam nut is tightened against the insertion member.

6. A mixing and blending apparatus for aggolmerating pulverulent material comprising a cylindrical casing, an elongate shaft rotatably mounted within said casing so that it is coaxial with said casing, means for at least partially enclosing a first end of said casing, the other end thereof being substantially unobstructed, a plurality of mixing beaters, each beater including a shank portion and a blade portion, means for attaching said beaters to said shaft so that they project radially away from the shaft axis toward the casing wall, said means including adjusting means for permitting the angular position of each beater to be changed with respect to the shaft without changing its effective length, the spacing between the casing wall and the centerline of the beater thereby being maintained at a predetermined distance regardless of the angular orientation of said beater, inlet means for admitting material into said casing, and outlet means for discharging said material therefrom through the unobstructed end of the casing.

7. A mixing and blending apparatus for agglomerating pulverulent material comprising a substantially cylindrical casing having an inlet end and a discharge end, said discharge end being substantially unobstructed thereby permitting the material to be freely discharged therefrom, a cantilevered shaft rotatably mounted within said casing adjacent the inlet end so that it is coaxial with said casing, the cantilevered end of the shaft projecting toward the discharge end of said casing and terminating adjacent said discharge end, a plurality of substantially equal length mixing beaters, means for attaching said beaters to said shaft so that they are positioned axially along said shaft and they project radially away from the shaft axis, the ends of said beaters terminating proximate the inner surface of the casing, and means for introducing a wetting agent into the casing for moistening the pulverulent material.

8. An agglomerator comprising a cylindrical casing, a cantilevered shaft rotatably mounted within said casing so that it is coaxial therewith, a plurality of mixing beaters, means for attaching said beaters to said shaft so that they project radially away from the shaft axis, means for adjusting the blade angle of each beater without changing the effective length of said beater, the spacing between the casing surface and the beater tip at its centerline thereby being maintained at a predetermined distance regardless of the angular orientation of said beater, inlet means for admitting material into said casing, and outlet means for discharging said material therefrom.

9. A mixing and blending apparatus comprising a cylindrical casing, means for maintaining said casing in a substantially vertical position, an elongate beater assembly rotatably mounted within said casing so that it is coaxial with said casing and rotatable about a vertical axis, said beater assembly including a shaft and a plurality of substantially equal length beaters secured to the shaft, means for rotatably mounting one end portion of said shaft adjacent the upper portion of said casing, the other end portion of said shaft being cantilevered within the casing so that it terminates proximate the lower end of the casing, means for attaching said beaters to said shaft so that they project radially away from the shaft axis, said beaters being spaced both longitudinally along and circumferentially around the shaft, inlet means located adjacent the upper portion of the casing for admitting material into said casing, and outlet means located adjacent the bottom portion of the casing for discharging said material therefrom, said outlet means forming the bottom end of the casing and having a cross-sectional dimension substantially equal to the cross-sectional dimension of the casing.

10. A mixing and blending apparatus compring a cylindrical casing, means for maintaining said casing in a substantially vertical position, an elongate beater assembly rotatably mounted within said casing so that it is coaxial with said casing and rotatable about a vertical axis, said beater assembly including a shaft and a plurality of beaters secured to the shaft, one end portion of said shaft being rotatably mounted adjacent the upper portion of said casing, means for attaching said beaters to said shaft so that they project radially away from the shaft axis, said beaters being spaced both longitudinally along and circumferentially around the shaft, each beater including a shank portion and a blade portion, said beaters being mounted in pairs along the longitudinal axis of said shaft, the beaters of each pair being spaced 180° apart relative to each other, and each pair being spaced 90° apart relative to an adjacent pair each pair of beaters being longitudinally spaced along said shaft so that when the shaft is rotated the longitudinal sweep of each pair of beaters is at least partially overlapped by the sweep of the next adjacent pair of beaters, means for adjustably attaching each beater to the shaft so that its angular position about its longitudinal axis can be varied without changing its effective length, inlet means located adjacent the upper portion of the casing for admitting material into said casing, and outlet means located adjacent the bottom portion of the casing for discharging said material therefrom.

11. An agglomerator comprising a vertically oriented cylindrical casing, a cantilevered shaft rotatably mounted within said casing so that it is co-axial with said casing and rotatable about a vertical axis, a plurality of longitudinlly spaced radially projecting beaters secured to said shaft in circularly spaced relation around its circumference, each beater including a shank portion and a blade portion, the projecting end of each beater being juxtaposed relative to the casing in such a manner that a predetermined spacing is maintained therebetween, means for adjustably securing each beater to the shaft so that its angular position about its longitudinal axis can be varied without changing the effective length of the beater, inlet means for admitting material to be agglomerated into said casing, and outlet means for discharging said material therefrom.

12. The combination of claim 11 wherein means are provided for introducing a fluid medium into said casing, said means being intermittently spaced around the upper portion of the casing.

13. An agglomerator comprising a cylindrical casing having an inlet end and a discharge end, means for maintaining the casing in a vertical position, cover means for at least partially enclosing the inlet end of said casing, the discharge end being substantially uncovered, said inlet end being at the top of the casing, an elongate shaft, means for rotatably mounting said shaft within said casing, said mounting means being positioned adjacent the upper end of the casing so that said shaft is cantilevered within said casing, a plurality of mixing beaters, each beater including a flattened blade portion, means for securing each beater to the shaft so that it lies in a horizontal plane and projects radially away from the shaft axis, the blade portion defining a predetermined angle with respect to a vertical plane, said means including an adjusting mechanism for permitting the blade angle of each beater to be changed without changing the effective length of the beater, the spacing between the casing and the beater tip at its centerline thereby being maintained at a predetermined distance regardless of the angular orientation of the beater, means for rotating the shaft about its longitudinal axis, and means located in the casing wall for introducing a wetting agent into said casing.

14. An improved beater for adjustable mounting in a mixing and blending apparatus comprising an elongate shank and a flattened blade portion connected to one end of said shank, said shank having a head portion at its other end, a threaded portion intermediate its ends, a first cylindrical portion adjacent the head portion, and a second cylindrical portion between the first cylindrical portion and the threaded portion, the diameter of said first cylindrical portion being smaller than the diameter of the head and second cylindrical portions, and the diameter of the second cylindrical portion being smaller than the diameter of the threaded portion.

15. An improved beater for a mixing and blending apparatus comprising an elongate shank provided with means for adjustably securing it to an elongate shaft forming a part of said apparatus, a flattened blade portion connected to one end of said shank, a head portion at the other end of said shank, a threaded portion intermediate the ends of the shank, and a cylindrical portion between said head and threaded portions, the diameter of said cylindrical portion being smaller than the diameter of the head and threaded portions.

16. A method of treating pulverulent material which comprises admitting said material into one end of an elongate cylindrical casing, rotatably supporting an elongate beater assembly within said casing solely by one of its ends adjacent said one end of said casing so that its other end projects toward the other end of the casing, said assembly having a plurality of beaters adjustably secured thereto and forming a part thereof, introducing a wetting agent into said casing, mixing and blending said material and said wetting agent by rotating said beater assembly so that a path circumscribed by each beater in a plane normal to the longitudinal axis of the beater assembly defines a prescribed circle the perimeter of which is maintainable at a prescribed distance from the casing wall, forcing the material through the casing as it is mixed and blended, and discharging the mixture from the other end of the casing.

17. A method of treating pulverulent material which comprises admitting said material into a vertically oriented cylindrical casing, introducing a wetting agent into the upper portion of said casing, mixing and blending said material and said wetting agent by rotating a beater assembly having a plurality of beaters adjustably secured thereto and forming a part thereof so that a path circumscribed in a horizontal plane by the tip of each beater defines a prescribed circle the perimeter of which is maintainable at a prescribed distance from the casing wall, forcing the material through the casing as it is mixed and blended, and discharging the mixture from the bottom of the casing, the beater assembly being rotatably supported solely by one of its end portions adjacent the upper portion of the casing so that its other end portion projects toward the bottom of the casing.

18. A method of forming agglomerates comprising the steps of admitting a pulverulent material into the upper portion of a vertically oriented processing casing having a discharge opening in the lower end portion, introducing a wetting agent into the upper portion of the casing, admixing said material and said wetting agent by subjecting them to the agitating action of a plurality of heaters adjustably secured to an elongate shaft rotatably mounted by supporting one of its ends adjacent the inlet end of the casing in such a manner that its other end projects toward the discharg end of the casing, forcing the moistened material through the casing by rotating said shaft about its longitudinal axis, and discharging the agglomerates from the bottom of the casing.

19. Apparatus for treating material comprising a vertically oriented cylindrical casing, a beater assembly including a cantilevered shaft coaxially and rotatably mounted within said casing and a plurality of substantially equal length mixing beaters attached to said shaft so that they project radially away from the shaft axis, inlet means located adjacent the upper portion of the casing for admitting material into said casing, outlet means located adjacent the bottom portion of the casing for discharging material from said casing, a drier, means for mounting said drier relative to the casing so that said casing is positioned directly above the drier whereby the material is discharged fro mthe casing directly into the drier.

20. The combination of claim 19 wherein the beaters are adjustably attached to the shaft, and means are provided for adjusting the blade angle of each beater without changing the effective length of said beater, the spacing between the inner surface of the casing and the beater tip at its centerline thereby being maintained at a predetermined distance regardless of the angular orientation of said beater.

21. The combination of claim 19 wherein the outlet means forms the bottom end of the casing, the cross-sectional dimension of said outlet being substantially equal to the cross-sectional dimension of the casing, and the projecting end of the beater assembly terminates proximate the lower end of the casing whereby said assembly aids in uniformly distributing the material into the upper portion of the drier.

References Cited by the Examiner
UNITED STATES PATENTS

| | | | |
|---|---|---|---|
| 2,887,305 | 5/1959 | Ginneken | 259—24 |
| 3,090,606 | 5/1963 | Burnet | 259—9 |
| 3,158,358 | 11/1964 | Fisher | 259—8 |

WALTER A. SCHEEL, *Primary Examiner.*